March 28, 1950 — C. Q. IVES — 2,501,676
METHOD OF TESTING INSULATING WALLS
Filed April 11, 1945

INVENTOR.
CHARLES QUINCY IVES
BY
ATTORNEYS

Patented Mar. 28, 1950

2,501,676

UNITED STATES PATENT OFFICE 2,501,676

METHOD OF TESTING INSULATING WALLS

Charles Quincy Ives, Reading, Mass.

Application April 11, 1945, Serial No. 587,814

3 Claims. (Cl. 175—183)

(Granted under the act of March 3, 1883, as amended April 30, 1928; 370 O. G. 757)

The invention described herein may be manufactured and used by or for the Government for governmental purposes without the payment to me of any royalty thereon.

This invention relates to a method of testing insulating walls such as switch-board panels, the walls of a battery box or the like, and more particularly the partition walls within a battery box, to determine whether there are any minute cracks, holes or other defects which would provide a path for leakage of electric current. The invention also relates to apparatus for practicing such method of testing insulating walls, much of which apparatus is shown in my Patent No. 1,744,120, granted January 21, 1930. An object of the invention is to make it possible to make effective tests of insulating walls without resorting to the use of dangerously high voltages. It is a further object of the invention to provide apparatus for such a test which is simple, effective and easy to operate. Battery boxes are customarily molded in one piece and consist of a suitable moldable plastic material shaped into hollow rectangular (oblong or square) form with two or more partition walls dividing the interior into three or more cavities for the individual cells. It is essential that the partition walls be free from defects such as pin holes, cracks and the like since any substantial leakage of current from one cell to another would soon run down the battery and destroy its usefulness. According to the present invention such battery boxes are tested by wetting the surface of the walls to be tested with a conducting liquid such as salt water. This can quickly and easily be done by filling the box with salt water and emptying it. While the walls are still wet a pair of metal surfaces are brought into contact with mutually opposed surface elements of one of the walls so that there is good interfacial contact between the metal surfaces and the wetted surfaces. For this purpose a pair of metal plates can conveniently be used. The plates are connected to a megohm resistance meter, that is, in series with a source of electrical energy of low voltage and a sensitive galvanometer. If the wall under test is in good condition, its electrical resistance will be very high so that little or no current will be indicated on the galvanometer. If, however, there is a defect in the portion of the wall between the plates, a conducting path will be established between the plates by the saline solution which penetrates such defects by capillarity, the viscosity of water being of low order. By moving the plates over the entire surface of the wall to be tested while keeping the plates opposite to each other and in good contact with the wetted surfaces, the entire area of a wall can thus be completely and reliably tested. In cases where a considerable number of areas of the same size are to be tested, as, for example, the partition walls of a large order of boxes of a given size, the contact plates can be made of the same size and shape as the wall surface so that a single engagement will suffice to test the entire wall and it will not be necessary for the plates to travel over the surfaces as when small plates are used.

In the drawing, Figure 1 is a diagrammatic view of apparatus by which the invention may be practiced.

Figure 1:
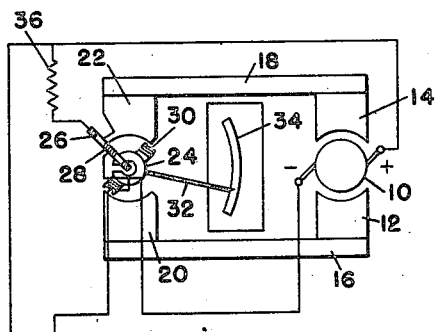
Figure 2:
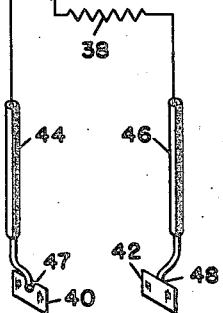
Figure 2 is a perspective view of tongs by which the contact plates may be readily manipulated.
Figure 2:
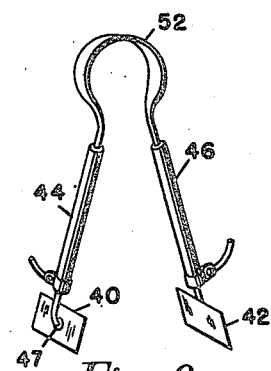
Figure 3:
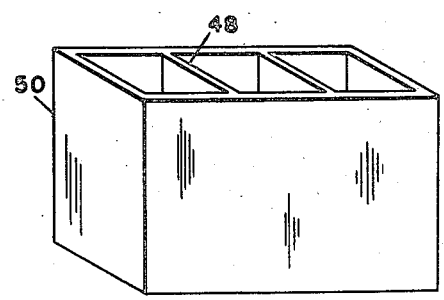
Figure 3 is a perspective view of a battery box.

The drawing shows diagrammatically a megohm resistance meter comprising a galvanometer and a source of voltage which is low particularly in comparison with the 20,000 or more volts customarily used in testing battery boxes. Such source may be a generator comprising a rotor 10 between the poles 12 and 14 of a pair of bar magnets 16 and 18. The same magnets provide a magnetic field for a galvanometer. For this purpose two pole pieces 20 and 22 are provided, between which is pivotally mounted a member 24 which carries the pair of coils 26 and 28 in one plane and a coil 30 in a plane perpendicular to the other. Mounted on the member 24 is an index 32 which moves over a scale 34. The brushes of the generator 10 are connected in a circuit which passes through the coils 26 and 28 and a resistance 36. The brushes of the generator are also connected through the coil 30 and a resistance 38 to a pair of metal plates 40 and 42 which are attached to insulating handles 44 and 46 preferably by swivel joints 47 so that the plates will adjust themselves to flat engagement with the wall faces when pressed against them. The circuit containing the plates 40 and 42 is parallel to the circuit containing the coils 26 and 28. The generator may be driven by hand or otherwise as desired since the actual values of the currents delivered are not important. When the plates 40 and 42 are separated from each other so that the resistance between them is infinite, current from the generator flows through the coils 26 and 28 but not through the coil 30. This causes the coils 26 and 28 to move into position in which the plane is perpendicular to the axis of the poles 20 and 22, thus the index 32 moves to the upper end of the scale 34. The plates 40 and 42 are then brought into contact with opposite surface elements of a wall such as a partition wall 48 of a battery box 50, the surfaces of the wall having previously been wetted by salt water or other conducting liquid of low viscosity. If there are no defects in the wall, its high resistance will keep the index 32 at the upper end of the scale. If, however, a defect provides a path for current between the plates 40 and 42, such current energizes the coil 30 and tends to move it toward a position in which its plane is perpendicular to the axis of the pole pieces 20 and 22. Thus the index 32 is moved down the scale 34. By using a comparatively sensitive galvanometer, small current leaks can thus be very readily detected as the plates 40 and 42 are moved over the entire surface of the wall to be tested. If the tops of the partitions are wet when the plates are applied to surface elements near the top of a partition, a sufficient path for current may thus be provided over the top edge of the partition to cause a considerable response on the meter. This can readily be avoided by wiping off the top edges after dipping the box. It may be helpful to dip and empty a box and apply the plates near the top of a partition without first wiping the top edge. If then a mark is put on the galvanometer scale to show the deflection of the pointer caused by the current flowing over the wet top of the partition, a similar indication on the scale in the course of testing operations will serve as a reminder to wipe the top of the partition being tested.

To facilitate manipulation of the plates 40 and 42, the dielectric handles 44 and 46 may be secured to a spring member 52, these parts forming a pair of tongs with the plates 40 and 42 as extremities. This insures continual opposition of the plates when in contact with wall surfaces, and also makes it easy for the operator to manipulate both plates with one hand. The plates 40 and 42 are, of course, electrically insulated from each other, either by the handles 44 and 46 or by any other well known means. In testing large surfaces such as switch board panels, however, separate plates on long leads, as shown in Figure 1, will be used.

I claim:

1. That method of testing a flat wall of dielectric material for leakage of electric current therethrough which comprises wetting the opposite faces of said wall with a conducting liquid which will penetrate by capillary action any defects in said wall, causing to be removed when present any of said liquid remaining on surfaces joining said opposite faces of said wall, contacting opposite surface portions of said opposite faces of said wall with respective ones of a pair of flat conducting surfaces having a low potential difference therebetween, and rendering manifest any flow of current between said pair of conducting surfaces and through said wall due to said potential difference, as a criterion of the dielectric condition of said wall.

2. That method of testing the electric insulating quality of a flat wall of dielectric material which comprises applying to at least one of two opposite faces of said wall an electrolyte solution capable of penetrating minute fissures in said wall, causing to be removed when present any of said solution remaining on surfaces joining said opposite faces of said wall, contacting opposite surface portions of said opposite faces of said wall with flat surfaces of respective ones of a pair of flat electrically conducting bodies, applying a low potential difference between said bodies, and detecting any flow of current between said bodies, through said wall, as a criterion of the electric insulating quality of said wall.

3. That method of testing the electric insulating quality of a flat wall of a battery box which comprises wetting both faces of said wall with salt water, causing to be removed when present any of said salt water remaining on surfaces joining said faces of said wall, simultaneously moving over said wetted faces at mutually opposite surface portions thereof and in electrical contact therewith flat surfaces of a pair of flat conducting plates, said flat conducting plates having a low potential difference therebetween to effect a flow of electric current between said plates through said wall when the latter has fissures therein containing said salt water, and applying such current flow to a sensitive current indicating device to detect said current flow as an indication of the insulating quality of said wall.

CHARLES QUINCY IVES.

REFERENCES CITED

The following references are of record in the file of this patent:

UNITED STATES PATENTS

| Number | Name | Date |
| --- | --- | --- |
| 687,517 | Clark et al. | Nov. 26, 1901 |
| 695,127 | Thomson et al. | Mar. 11, 1902 |
| 1,427,817 | Hutchinson | Sept. 5, 1922 |
| 1,506,761 | MacPherson | Sept. 2, 1924 |
| 1,515,864 | Lapp | Nov. 18, 1924 |
| 1,643,949 | Kyle | Oct. 4, 1927 |
| 1,744,120 | Ives | Jan. 21, 1930 |
| 2,103,134 | Akihira | Dec. 21, 1937 |
| 2,203,839 | Ogilvie | June 11, 1940 |
| 2,304,710 | Schmidt | Dec. 8, 1942 |
| 2,379,947 | Bandur | July 10, 1945 |

OTHER REFERENCES

Publication "Electrical Measurements," by Laws, pages 204, 205, and 206.